United States Patent [19]

Richmond et al.

[11] 4,021,803

[45] May 3, 1977

[54] PROXIMITY SENSING APPARATUS

[75] Inventors: Martin R. Richmond, Watertown; William R. Hutchins, Waltham, both of Mass.

[73] Assignee: Raytheon Company, Lexington, Mass.

[22] Filed: Jan. 30, 1952

[21] Appl. No.: 268,976

[52] U.S. Cl. .......................... 343/7 PF; 102/70.2 P; 343/12 MD
[51] Int. Cl.² ......................................... F42C 13/04
[58] Field of Search ................... 343/7–9, 343/12 MD; 102/70.2 P

[56] References Cited

UNITED STATES PATENTS

| 2,620,470 | 12/1952 | Rather et al. | 343/9 |
| 2,631,278 | 3/1953 | Kiebert | 343/7 |
| 2,638,585 | 5/1953 | Priest | 343/7 |

Primary Examiner—Maynard R. Wilbur
Assistant Examiner—Richard E. Berger
Attorney, Agent, or Firm—Richard M. Sharkansky; Joseph D. Pannone

[57] ABSTRACT

This invention relates to a proximity sensing apparatus for energizing a control circuit whenever the distance between two objects moving relative to one another at an angle other than 180° becomes a minimum, and more particularly, relates to a proximity sensing apparatus operating on the zero doppler principle for energizing a detonation circuit in a missile whenever said missile passes closest to a target.

15 Claims, 10 Drawing Figures

INVENTORS
MARTIN R. RICHMOND
WILLIAM R. HUTCHINS

BY *Elmer J. Gorn*

ATTORNEY

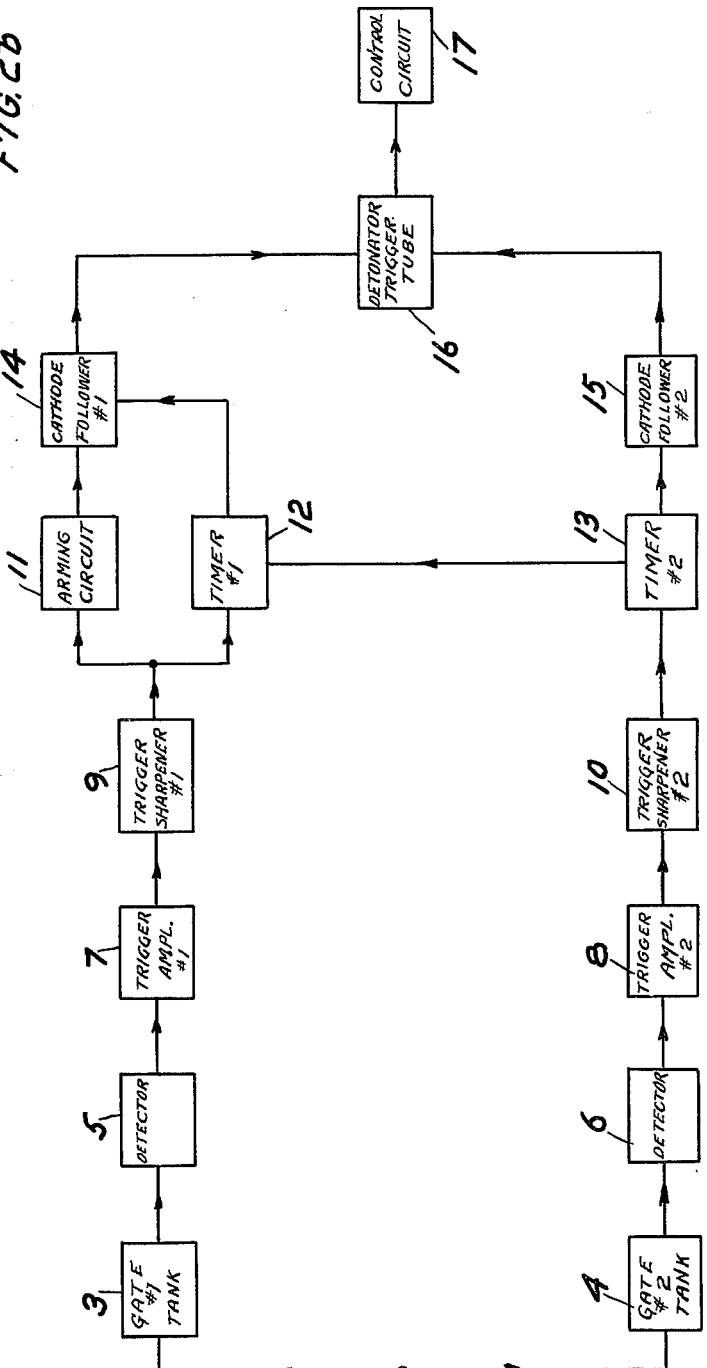

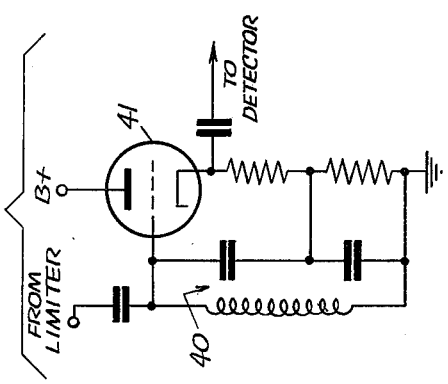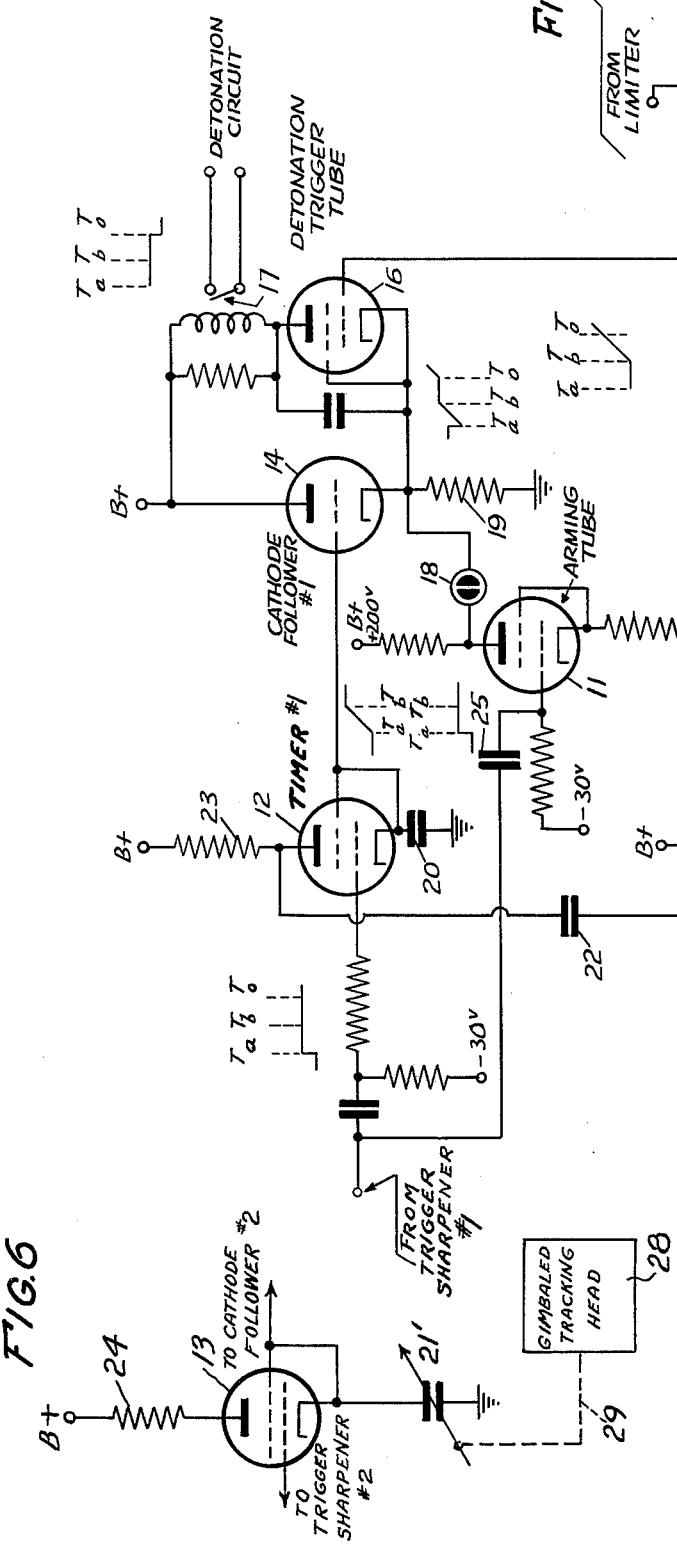

PROXIMITY SENSING APPARATUS

The proper time of the detonation of a warhead in a guided missile may be computed from the rate of change of doppler signal in the final stage of the missile flight. A doppler radar installed in the missile measures the relative speed between the missile and the target to a high degree of accuracy. In the event that a miss occurs, the relative speed between target and missile decreases from a maximum value to zero at the point of minimum distance. Since the doppler frequencies measured are directly proportional to the relative speeds encountered, the doppler frequency will be zero at the instant of nearest miss.

The doppler signal sweeps toward zero frequency as the missile approaches the target. A pair of tank circuits are tuned to doppler frequencies corresponding to fixed angles $\theta$ between the line of flight of the missile and the instantaneous line from missile to target. As the doppler signal sweeps into the frequency gate of the first tank circuit, a pulse is developed which is detected and used to trigger a first timer circuit. This timer measures the time required for the doppler frequency to sweep from the tuned frequency of the first tank to that of the second in terms of the voltage on the timer capacitor. The second tank similarly triggers a second timer circuit which predicts the correct instant for firing. The voltage on the capacitor of the first timer is, at the moment of initiation of the second pulse, a function of the time between pulses. The capacitor of the first timer charges at a fixed rate during the time of traverse of the missile between a first and second point in the flight path. At the time corresponding to said second point, the condenser of the second timer charges from the same voltage source at a fixed rate which may equal that of the first timer condenser; simultaneously, the first timer is disabled. The two aforesaid points are defined by instantaneous angles $\theta_1$ and $\theta_2$ which are selected so that the voltage change from the first point to the second point equals the voltage change from the second point to the firing point. The warhead is set to fire when the voltage on the two capacitors is equal. A more complete description will be given subsequently.

An object of this invention is to provide proximity sensing apparatus which will energize a control circuit whenever the distance between two bodies moving relative to one another becomes a minimum or substantially a minimum.

A further object of this invention is to provide a means for energizing a detonation circuit in a missile whenever the doppler frequency, which is a function of the relative velocity between the missile and the target, becomes zero or substantially zero.

Other and further advantages of this invention will be understood from the following exemplifications of the invention, reference being had to the accompanying drawings, wherein:

FIG. 2a is a curve illustrating the relation between both doppler frequency and relative velocity and time during a typical flight;

FIG. 2b is a curve illustrating the relation between both relative velocity and doppler frequency and the angle between the missile line of flight and a line of sight between the missile and the target;

FIG. 3 is a block diagram of an embodiment of the proximity sensitive circuit according to the invention;

FIG. 4 is a schematic diagram of a typical gate circuit as used in the circuit of FIG. 3;

FIG. 5 is a schematic diagram of a portion of the circuit shown in FIG. 3;

FIG. 6 is a modification of the diagram of FIG. 5 for use when the lead angle is other than zero.

If two objects are moving relatively with respect to one another other than directly toward or directly away from one another, the relative velocity between the two objects diminishes as the distance between the objects decreases until, at the point of passing of the two objects, the relative velocity becomes zero. The relation between relative velocity and time is shown in FIG. 2a. The doppler signal received by the control missile is proportional to the relative velocity of the missile and the moving target and to the frequency of the radar set within the missile.

The doppler frequency $f_D$ in cycles per second is given by $$f_D = 89.4 \, (V_R/\lambda) \tag{1}$$

where the relative velocity $V_R$ is given in mph, and the wave length $\lambda$ given in centimeters. As the maximum relative velocity, that is, the velocity soon after launching of the missile, is increased, the maximum doppler frequency, as given by equation (1), increases. This relationship is also shown by FIG. 2a.

Figure 1A:
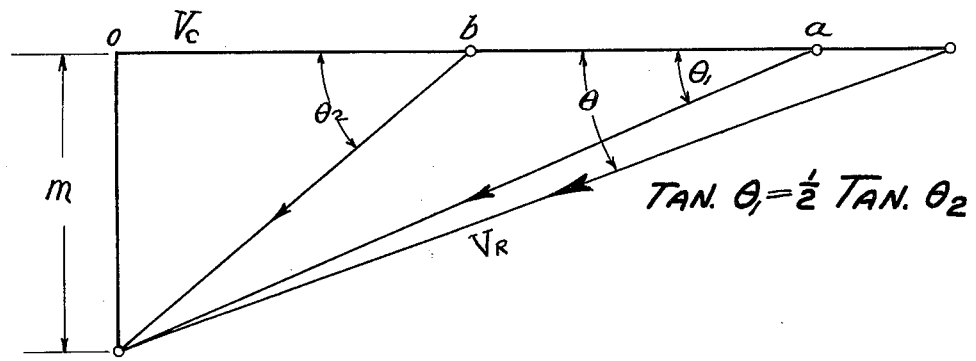
FIGS. 1a, 1b and 1c are graphical illustrations of certain principles involved in the invention.

Referring to FIG. 1a, as the missile reaches point a in its flight path abo, the angle $\theta$ between the line of flight of the missile moving with a closing velocity $V_c$ and the instantaneous line of sight from missile to target becomes $\theta_1$. At a later time the missile reaches point b in the flight path and the angle $\theta$ changes to $\theta_2$. The closer the missile comes to the target, the larger the angle $\theta$ becomes, until, at the point o in the flight path of nearest miss, angle $\theta$ becomes 90°. FIG. 2b shows that both the doppler frequency and the relative velocity vary as the cosine of angle $\theta$. During the early part of the missile flight the distance between missile and target is so great that $\theta$ is approximately equal to zero and the instantaneous doppler frequency is substantially equal to the maximum doppler frequency determined by equation (1). As the missile approaches the target, the angle $\theta$ gradually increases until it becomes 90° as the missile passes point o. At this point the doppler frequency has dropped to zero, as shown in FIG. 2b.

A method of obtaining detonation at zero time is illustrated by referring to FIG. 1a. The angles $\theta_1$ and $\theta_2$ are chosen so that $\tan \theta_1 = \frac{1}{2} \tan \theta_2$. The time required to traverse the distance $\overline{ab}$ is then equal to the time required to traverse the distance from b to the firing point o. Hence, detonation occurs at the lapse of time after passing point b which is equal to the interval from a to b. Any angles $\theta_1$ and $\theta_2$ may be selected so long as the relation previously mentioned obtains. For example, the angle 65° has a tangent equal to 2.1445. Referring to trigonometric tables, the arctangent of 4.2890 is found to be approximately 76.9°. By reference to the curve of FIG. 2b, one may find the doppler frequency corresponding to the angles 65° and 76.9°. The frequencies thus obtained are chosen as the resonant frequency of tank circuits of two gates in the doppler detonation circuit later described.

If a constant relative velocity is assumed, the tank frequency may be fixed at values corresponding to angles $\theta_1$ and $\theta_2$ derived from a curve as shown in FIG. 2b which corresponds to the velocity assumed. For example, if a missile-target closing rate $V_c$ of 600 mph is assumed and if angles $\theta_1$ and $\theta_2$ are chosen equal to 65° and 76.9°, respectively, the maximum value of $F_D$ may be calculated from equation (1) to be $F_D = (89.4 \times 600)/3 = 17.8$ KC. The doppler curve is, therefore, a cosine curve having a maximum value of 17.8. For example, at 60°, the cosine is 0.500 so that the doppler frequency is $0.500 \times 17.8$ or 8.9 KC, and so forth. The doppler frequencies corresponding to the angles 65° and 76.9° will be approximately 7.5 KC and 4 KC.

Referring now to FIG. 3, a limiter 2 receives the video signal, shown in curve (a) of FIG. 6, from the video amplifiers of doppler radar set 1 mounted in the missile. Radar set 1 transmits signals of fixed frequency which strike the target and are reflected back. In consequence of the relative motion of the missile and target, the phase of the returned signal, relative to the transmitted signal, shifts continuously. In other words, the returned frequency is different from the transmitted frequency. This frequency difference or doppler frequency affords a measurement of the relative velocity between the missile and the target.

Limiter 2 limits all video signals greater than about 0.01 volt and serves to discriminate against weaker noise signals. A first gate 3, shown in detail in FIG. 4, comprises a Colpitts oscillator type tank circuit 40 connected in the grid-cathode circuit of a tube 41 and tuned to 7.5 KC; the Q of this circuit is between 50 and 100. A second gate 4 is similar to gate 3 except that the tank circuit is tuned to 4 KC. Both gates are connected to limiter 2. The outputs of gates 3 and 4, shown in curves (b) and (f), respectively, of FIG. 6, are detected in conventional detectors 5 and 6 and the detected pulses, shown in curves (c) and (g), are fed to trigger amplifiers 7 and 8, respectively. The latter amplifies the rectified pulses from approximately 1 volt to about 20 volts. The outputs from amplifiers 7 and 8, shown in curves (d) and (h), respectively, are used to fire trigger sharpeners 9 and 10, respectively, which are conventional cathode-coupled multivibrators, producing positive pulses of approximately 125 volts amplitude and having a duration of about 0.1 second. See curves (e) and (i). Only the leading edge of the positive pulse is used to trigger the timing and arming circuits, later described in more detail in connection with the description of FIG. 5.

The output of trigger sharpener No. 1 fires both an arming circuit 11 and timer No. 1. Arming circuit 11, the output of which is shown in curve (j), serves to unblock cathode follower No. 1 so that the latter may follow any output derived from counter No. 1. An output voltage, shown in curve (k), which increases substantially linearly with time is initiated in timer No. 1 and is fed through cathode follower No. 1 to one of the electrodes of a detonator trigger tube 16 which is normally nonconducting. The output of trigger sharpener No. 2 fires timer No. 2 to produce an output voltage, shown in curve (1), which is applied through cathode follower No. 2, the output of which is similar to that of timer No. 2, to another electrode of detonation trigger tube 16. When the difference between the amplitude of the inputs to said electrodes of tube 16 becomes approximately zero, tube 16 becomes conducting and the output pulse, shown in curve (n), causes activation of the detonation circuit 17.

Referring now to FIG. 5, prior to the arrival of a trigger from the 7.5 KC trigger sharpener No. 1, the detonation trigger tube 16 is biased by the current flowing from B + through a neon tube 18, cathode resistor 19 and ground. When the doppler frequency sweeps past 7.5 KC the positive pulses of trigger sharpener No. 1 are applied to the grid of timer tube 12 firing the tube and causing condenser 20 in the cathode to charge exponentially toward B +, as shown in curve (k) of FIG. 6. The slope of the charging voltage is practically linear. The rate of charge is determined by the time constant of the circuit including plate resistor 23, the equivalent plate impedance of tube 12 and capacitor 20. The value of plate resistor 23 is chosen to adjust the current flow through tube 12 so that the plate impedance is about 7,000 ohms.

At the moment first gate 3 is energized by 7.5 KC doppler, a positive pulse from trigger sharpener No. 1 is applied to the control grid of arming tube 11 through capacitor 25. The resultant firing of tube 11 causes a reduction in the potential at the plate sufficient to cut off neon tube 18. There is no longer a bias produced across resistor 19 and the voltage at the cathode of cathode follower 14 drops from about 50 volts to zero volts. Cathode follower 14 is now able to follow the positive-going signal from timer No. 1, shown in curve (k).

When the doppler frequency sweeps past 4 KC, the second gate 4 is energized. The positive trigger pulses from trigger sharpener No. 2 are applied to the control grid of timer No. 2 to fire timer tube 13. A capacitor 21 having the same value as capacitor 20 starts charging toward B + at a rate equal to that of capacitor 20. Timer No. 2 is identical to timer No. 1 so that the charging rates of timer condensers 20 and 21 are the same. At the moment timer No. 2 fires, a condenser 22 connected between the plates of the two timers applies a negative pulse to the plate of timer No. 1 thereby cutting off this timer and halting the rise of the voltage across condenser 20. The amplitude of the voltage across condenser 20 is proportional to the time difference between the responses from the first and second gates and is equal to $(T_1 - T_b)$ (RC) where $T_a$ and $T_b$ are the times at which points a and b of FIG. 1 are reached by the missile and (RC) is the time constant of counter No. 1.

The cathode follower 14 follows the charge on timer condenser 20 of counter No. 1. The output of cathode follower 14, shown in curve (m) of FIG. 6, is connected to the cathode of detonation trigger tube 16. Cathode follower 15 follows the voltage on timer condenser 21 of timer No. 2. The output of ccathode follower 15, shown in curve (1) of FIG. 6, is connected to the control grid of detonation tube 16. When the difference between the voltage on the grid and the voltage on the cathode becomes less than approximately 2 volts, tube 16 fires. A relay in the plate circuit of the detonation tube is closed and detonation circuit 21 is fired.

It should be understood, however, that the control circuit in the output of tube 16 may be used for other than detonation of a missile warhead. For example, a camera shutter may be actuated or an object dropped from a moving body, and so forth.

Figure 1B:
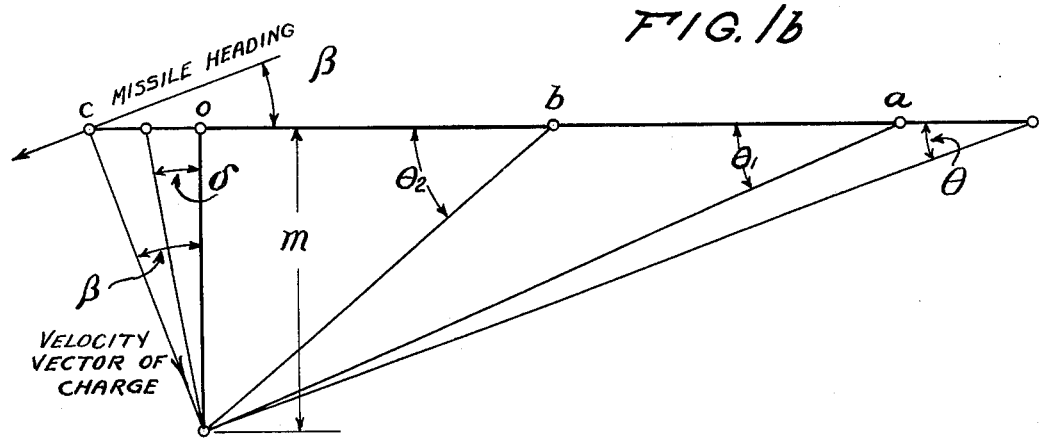
Figure 1C:
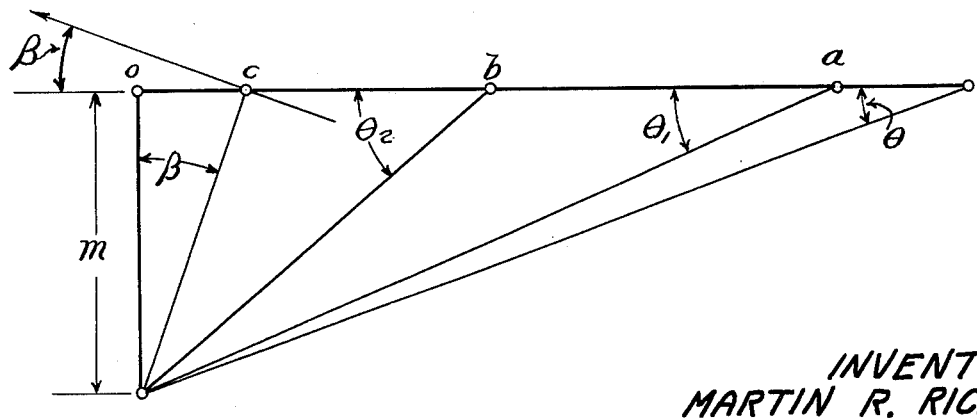
Figure 7:
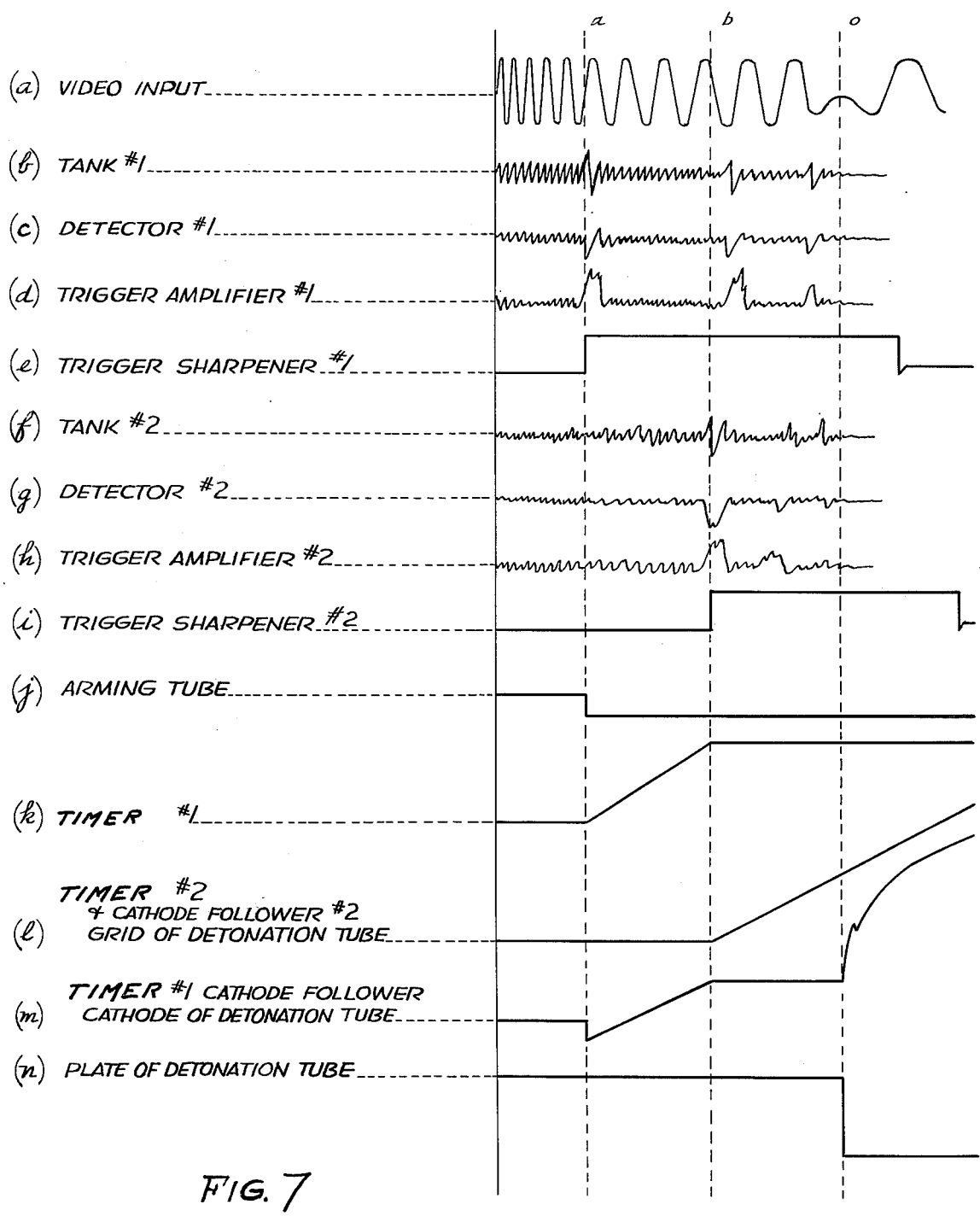
FIG. 7 is a series of wave forms explanatory of the circuit shown in FIGS. 3 to 5.

From FIG. 1 it has been shown that the distance ab has been made equal to $T_o$. If the relative velocity between missile and target is assumed constant over the final portion of the flight, the time interval $(T_b - T_a)$ required to traverse the distance $\overline{ab}$ will be equal to the time interval $(T_o - T_b)$ for passage of the missile between points $b$ and $o$. By making the total charge of timer condenser 20 proportional to the time interval $(T_b - T_a)$, it becomes evident that, as the rate of charge of timer condenser 21 is made equal to that of timer condenser 20, the instant that condenser 21 reaches the same charge as condenser 20 corresponds to a time $T_o$ such that $(T_o - T_b) = (T_b - T_a)$. This is the exact instant at which a miss distance $m$ is a minimum and at which the warhead in the missile should be detonated.

The above analysis has assumed a zero lead angle; that is, the angle between the axis of the radar antenna and the axis of the missile is zero. If the explosive charge in the missile is fired broadside to the missile, the time for detonation, when the lead angle is other than zero, will be other than that at which the missile passes point $o$. The point of firing will be a function of the lead angle data. If the final control of the missile is such that the axis of the missile is turned toward the line of sight, as shown in FIG. 1$b$, the firing point should be altered, as explained infra.

Referring again to FIG. 1$b$, the distances $\overline{ab}$ and $\overline{bo}$ are equal, as in FIG. 1$a$. It is evident that $$\overline{co} = m \tan \beta \tag{2}$$

and the time taken to traverse distance $\overline{co}$ is $$T_{\overline{co}} = T_m \tan \beta \tag{3}$$

The time $T_m$ taken to travel the distance $m$ is also given by $$T_m = T_{\overline{bo}} \tan \theta_2 = T_{\overline{ao}} \tan \theta_1 \tag{4}$$

Since distance equals the product of velocity and time, the distance $\overline{bo}$ may be written $$\overline{bo} = V(T_{\overline{ao}} - T_{\overline{bo}}) \tag{5}$$

where $V$ is velocity and $T_{\overline{ao}}$ and $T_{\overline{bo}}$ are the times required to traverse distances $\overline{ao}$ and $\overline{bo}$, respectively. Likewise, the distance $\overline{co}$ may be given by $$\overline{co} = V(T_m \tan \beta) \tag{6}$$

From equations (5) and (6), the distance $\overline{bc}$ is $$\overline{bc} = \overline{bo} + \overline{co} = V[(T_{\overline{ao}} - T_{\overline{bo}}) + T_m \tan \beta] \tag{7}$$

Rewriting the last term of equation (7) by its equivalent from equation (4), $$\overline{bc} = V[(T_{\overline{ao}} - T_{\overline{bo}}) + T_{\overline{bo}} \tan \theta_2 \tan \beta] \tag{8}$$

Dividing by velocity $V$, $$T_{\overline{bc}} = (T_{\overline{ao}} - T_{\overline{bo}}) + T_{\overline{bo}} \tan \theta_2 \tan \beta \tag{9}$$

since $$T_{\overline{ao}} - T_{\overline{bo}} = T_{\overline{ab}} \tag{10}$$

Equation (9) may be rewritten, in view of equation (10), as $$T_{\overline{bc}} = T_{\overline{ab}} + T_{\overline{bo}} \tan \theta_2 \tan \beta \tag{11}$$

But, by definition $$T_{\overline{bo}} = T_{\overline{ab}} \tag{12}$$

Therefore $$T_{\overline{bc}} = T_{\overline{ab}} (1 + \tan \theta_2 \tan \beta) \tag{13}$$

The time interval $T_{\overline{oc}}$ is thus given by $$T_{\overline{oc}} = T_{\overline{ab}} \tan \theta_2 \tan \beta \tag{14}$$

From equation (13) it is possible to calculate the time at which the missile reaches firing point $c$. The voltage $E_c$ attained in the second timer circuit at the time that the missile reaches point $c$ is given by $$E_c = E_b (1 + \tan \theta_2 \tan \beta) \tag{15}$$

where $E_b$ is the voltage corresponding to time $T_b$.

Compensation for lead angle may be effected by changing the time constant of timer circuit No. 2. More specifically, the capacitance of condenser 21 in timer No. 2 may be increased so that condenser 21 charges more slowly. In this way, the output voltage of timer No. 2 does not reach a value equal to the voltage at timer No. 1 until a timer after $T_o$ which is given by $T_{ab} \tan \theta_2 \tan \beta$. The capacitance $C'$ necessary to effect the voltage change indicative of this time is given by $$C' = C \tan \theta_2 \tan \beta \tag{16}$$

where $C$ is the capacitance of condenser 21 under the condition of zero lead angle. The angles $\theta_2$ and $\beta$ are readily determinable from the equipment located in the missile. For example, as shown in FIG. 6, a gimbaled tracking head 28 of the missile may be conneceted by a mechanical linkage 29 to the rotor section connected a variable condenser 21' and is adapted to rotate the rotor plates of variable condenser 21' to vary the capacitance by an amount dependent upon the quantity $\tan \theta_2 \tan \beta$.

The lead angle may include any fixed charge firing angle. For example, if the fixed angle at which fragments are directed is at an angle $\alpha$ with the normal to the longitudinal axis of missile, and effective lead angle $\delta$ equal to $\beta + \alpha$ is obtained. To illustrate, if the fragments are directed toward the front end of the missile, the angle $\delta$ will be as shown in FIG. 1$b$. The term $\beta$, as used in the specification, refers to the effective lead angle, unless otherwise specified. In the usual case of firing broadside to the missile $\beta$ would equal $\delta$.

If the final control of the missile is such that the axis of the missile is turned away from the line of sight, as shown in FIG. 1$c$, the firing point should be altered as in the case previously described except that the lead angle is such as to dictate firing before time $T_o$. It is obvious that the same equations as those previously derived may be derived in this case except that the sign before the last term of equations (7) through (9) and (13) is changed. The equation for this condition becomes $$T_{\overline{bc}} = T_{\overline{ab}} (1 - \tan \theta_2 \tan \beta)$$

The rotor plates of variable condenser 21', shown in FIG. 6, are now caused to rotate in a direction such as to decrease the capacitance of condenser 21', thereby decreasing the time constant of timer No. 2 and allowing condenser 21' to charge at a faster rate than under the condition of zero lead angle.

The sensing of whether to add or subtract time interval $T_{\overline{sc}}$ is dependent upon the relationship between the direction of final control applied to the missile and the position of the antenna with respect to the missile axis.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A proximity sensing system for use in actuating a control circuit in a first object which is moving toward a second object in such a manner that a miss occurs comprising a doppler radar set carrying an antenna and installed in said first object to measure the relative velocity between said first object and said second object by means of the changing doppler signals received thereby, the angle between the axis of said antenna and the axis of said missile being equal to zero, first means responsive to the changing doppler signals for deriving a first voltage which varies substantially linearly with respect to time and which is indicative of a time required for said first object to traverse a predetermined distance, a second means responsive to the changing doppler signals for deriving a second voltage which increases substantially linearly with respect to time at the same rate as said first voltage, a control circuit, and means operative when said second voltage becomes equal to said first voltage for energizing said control circuit.

2. A proximity sensing system for use in actuating a control circuit in a guided missile which is moving toward a target in such a manner that a miss occurs comprising a doppler radar set including an antenna and installed in said missile to measure the relative velocity between said missile and said target by means of the changing doppler signals received thereby, first means responsive to the changing doppler signals for deriving a first voltage which varies substantially linearly with respect to time and which is indicative of a time required for said missile to traverse a predetermined distance, a second means responsive to the changing doppler signals for deriving a second voltage which varies substantially linearly with respect to time at a rate dependent upon the angle between the axis of said antenna and the axis of said missile, a control circuit, and means operative when said second voltage becomes equal to said first voltage for energizing said control circuit.

3. A proximity sensing system for use in actuating a control circuit in a guided missile which is moving toward a target in such a manner that a miss occurs comprising a doppler radar set including an antenna and installed in said missile to measure the relative velocity between said missile and said target by means of the changing doppler signals received thereby, first means responsive to the changing doppler signals for deriving a first voltage which varies linearly with respect to time at a first rate and which is indicative of a time required for said missile to traverse a predetermined distance, a second means responsive to the changing doppler signals for deriving a second voltage which increases linearly with respect to time at a second rate differing from said first rate, a control circuit, and an electron discharge device rendered conducting when said second voltage becomes equal to said first voltage for energizing said control circuit.

4. A proximity sensing system for energizing a detonation circuit in a missile carrying an explosive charge whenever said missile reaches a position relative to a target at which the full force of said charge may strike said target comprising a radar set carrying an antenna and installed in said missile to measure the relative speed between said missile and said target by means of changing doppler signals received thereby, a first means responsive to a first doppler frequency for deriving a first trigger pulse, a second means responsive to a second doppler frequency of lower value than the first for deriving a second trigger pulse, a first timer energized by said first trigger pulse to derive a first voltage which varies substantially linearly with respect to time at a first rate and which is indicative of time required for the doppler frequency to sweep from the tuned frequency of said first means to that of said second means, a second timer energized by said second trigger pulse for deriving a second voltage which increases substantially linearly with respect to time at a second rate differing from said predetermined rate by an amount dependent upon the angle between the axis of said missile and the axis of said antenna, an electron discharge device, means for applying said first and second voltages to said electron discharge device, control means associated with said electron discharge device and adapted to be activated when said second voltage becomes equal to said first voltage.

5. A proximity sensing system for energizing a control circuit in a missile whenever said missile passes closest to a target comprising a radar set installed in said missile to measure the relative speed between said missile and said target by means of changing doppler signals received thereby, a first means responsive to a first doppler frequency for deriving a first trigger pulse, a second means responsive to a second doppler frequency of lower value than the first for deriving a second trigger pulse, a first timer energized by said first trigger pulse to derive a first voltage which varies substantially linearly with respect to time at a predetermined rate, a second timer energized by said second trigger pulse for deriving a second voltage which increases substantially linearly with respect to time at said predetermined rate, an electron discharge device, means for applying said first and second voltages to said electron discharge device, control means associated with said electron discharge device and adapted to be activated when said second voltage becomes equal to said first voltage.

6. A proximity sensing system for energizing a control circuit in a missile whenever said missle passes closest to a target comprising a radar set installed in said missile to measure the relative speed between said missile and said target by means of changing doppler signals received thereby, a first means responsive to a first doppler frequency for deriving a first trigger pulse, a second means responsive to a second doppler frequency of lower value than the first for deriving a second trigger pulse, a first timer energized by said first trigger pulse to derive a first voltage which varies substantially linearly with respect to time at a predetermined rate and which is indicative of the time required for the doppler frequency to sweep from the tuned frequency of said first means to that of said second means, a second timer energized by said second trigger pulse for deriving a second voltage which increases substantially linearly with respect to time at said predetermined rate, an electron discharge device, means for applying said first and second voltages to said electron discharge device, control means associated with said electron discharge device and adapted to be activated when said second voltage becomes equal to said first voltage.

7. A proximity sensing apparatus for use in actuating a control circuit upon the nearest approach of two objects moving toward one another comprising a rader set installed in one of said objects to measure the relative speed between said objects by means of changing doppler signals received thereby, a first means responsive to the attainment of a first doppler frequency indicative of a first angular relationship between the line of flight of one of said objects and a line between said objects, a second means responsive to the subsequent attainment of a second doppler frequency and indicative of a second said angular relationship, third means responsive to energization of said first means for deriving a first voltage proportional to a first distance traveled by said first object between the times of attainment of said first and second doppler frequencies and fourth means responsive to energization of said second means for deriving a second voltage proportional to a second distance substantially equal to said first distance and control means responsive to said first and second voltages to effect a control operation.

8. A proximity sensing apparatus for use in actuating a control circuit upon the nearest approach of two objects moving toward one another comprising a radar set installed in one of said objects to measure the relative speed between said objects by means of changing doppler signals received thereby, a first means responsive to the attainment of a first doppler frequency indicative of a first angular relationship between the line of flight of one of said objects and a line between said objects, a second means responsive to the subsequent attainment of a second doppler frequency and indicative of a second said angular relationship, third means responsive to energization of said first means for deriving a first voltage proportional to a first distance traveled by said first object between the times of attainment of said first and second doppler frequencies and fourth means responsive to energization of said second means for deriving a second voltage proportional to a second distance equal to said first distance, an electron discharge device, means connecting said first and second voltages to said electron discharge device, and control means operative when said second voltage becomes equal to said first voltage to effect a control operation.

9. A proximity sensing apparatus for actuating a control circuit in a first object carrying an explosive charge when said first object, while moving relatively toward a second object, reaches a position most effective for firing said charge at said second object comprising a radar set including an antenna carried in said first object, said radar set being adapted to receive changing doppler signals from said second object corresponding to the relative velocity between said objects, a first means responsive to a first doppler frequency corresponding to a first time away of the first object from said position for deriving a first voltage varying approximately linearly with respect to time, toward said a second means responsive to a second doppler frequency corresponding to a second time away of said first object from said position for preventing further variations in said first voltage and for deriving a second voltage varying approximately linearly with respect to time at a rate dependent upon the angle between the axis of said first object and the axis of said radar antenna, an electron discharge device rendered conductive at said position in response to said first and second voltages, and a control circuit actuated during conduction of said electron discharge device to fire said charge.

10. A proximity sensing apparatus for operating a control circuit in a first object at the time, corresponding to zero doppler frequency, of minimum distance between said first object and a second object toward which said first object is moving at an instantaneous relative velocity proportional to the cosine of an angle $\theta$ between the line of flight of said first object and a line from said first object to said second object comprising a radar set carried by said first object and adapted to transmit energy toward said second object first means for receiving a changing doppler frequency corresponding to the cosine of the angle $\theta$, a second means tuned to an instantaneous doppler frequency corresponding to an angle $\theta = \theta_1$, a third means tuned to a doppler frequency corresponding to the cosine of an angle $\theta = \theta_2$, said angles $\theta_1$ and $\theta_2$ being such that $\tan \theta_1 = \frac{1}{2} \tan \theta_2$, whereby the time interval during a change in angle $\theta$ from $\theta_1$ to $\theta_2$ is equal to the time interval between a change in angle $\theta$ from $\theta_2$ to 90°, fourth means responsive to energization of said second means for deriving a first voltage increasing at a predetermined rate with respect to time, a fifth means responsive to energization of said third means for preventing further increase of said first voltage and for deriving a second voltage which increases at said predetermined rate with respect to time, a control circuit, an electron discharge tube responsive to said first and second voltages for energizing said control circuit.

11. A proximity sensing system for energizing a detonation circuit in a missile carrying an explosive charge whenever said missile reaches a position relative to a target at which the full force of said charge may strike said target comprising a radar set installed in said missile to measure the relative speed between said missile and said target by means of changing doppler signals received thereby, a first means responsive to a first received doppler frequency for deriving an output indicative of a first time away of said missile from said position, and second means responsive to a second received doppler frequency occurring after and lower than said first received doppler frequency for deriving a second output indicative of a second time away of said missile from said position which is less than said first time away; and control means responsive to said first and second outputs for energizing said detonation circuit.

12. A proximity sensing system for energizing a detonation circuit in a missile carrying an explosive charge whenever said missile reaches a position relative to a target at which the full force of said charge may strike said target comprising a single radar set installed in said missile to measure the relative speed between said missile and said target by means of changing doppler signals received thereby, said radar set including a single radiating means for radiating energy of a single frequency, a first means responsive only to a first received doppler frequency for deriving an output indicative of a first time away of said missile from said position, and second means responsive only to a second received doppler frequency for deriving a second output indicative of a second time away of said missile from said position; and control means responsive to said first and second outputs for energizing said detonation circuit.

13. A proximity sensing apparatus for use with two objects moving relative to each other comprising a single radar set installed in one of said objects to measure the relative speed between said two objects by means of changing doppler signals received thereby, said radar set including a single radiating element for transmitting energy of a single frequency toward the other of said objects, a first means responsive to a first received doppler frequency for deriving a first voltage which increases at a predetermined rate with respect to time, a second means responsive to a second received doppler frequency for preventing further increase of said first voltage and for deriving a second voltage which increases at a predetermined rate with respect to time, means including an electron discharge device and responsive to said first and second voltages for producing a control effect whenever said first and second voltages render said discharge device conductive.

14. A proximity sensing apparatus for use with two objects moving relative to each other comprising a single radar set installed in one of said objects to measure the relative speed between said two objects by means of changing doppler signals received thereby, said radar set including a single radiating element for transmitting energy of a single frequency toward the other of said objects, a first means responsive to a first received doppler frequency for deriving a first voltage which increases at a predetermined rate with respect to time, a second means responsive to a second received doppler frequency for deriving a second voltage which increases at said predetermined rate with respect to time, a control circuit including an electron discharge device, means for successively applying said first and second voltages to said discharge device, said control circuit being operative when said second voltage becomes equal to said first voltages for producing a control effect.

15. A proximity sensing apparatus for use with two objects moving relative to each other comprising a single radar set installed in one of said objects to measure the relative speed between said two objects by means of changing doppler signals received thereby, said radar set including a single radiating element for transmitting energy of a single frequency toward the other of said objects, a first means responsive to a first received doppler frequency for deriving a first voltage which increases at a first predetermined rate with respect to time, a second means responsive to a second received doppler frequency for preventing further increase of said first voltage and for deriving a second voltage which increases at a second predetermined rate with respect to time, a control circuit including an electron discharge device having a plurality of electrodes, means connecting said first voltage to one of said electrodes, means connecting said second voltage to another one of said electrodes, and means for energizing said control circuit whenever said first and second voltages render said discharge device conductive.

* * * * *